June 22, 1954

M. B. WIDESS 2,681,567

SYSTEM FOR OBTAINING AND TRANSMITTING
MEASUREMENTS IN WELLS DURING DRILLING

Filed Dec. 29, 1949

To Cut-off Device

INVENTOR:
Moses B. Widess

BY *Newell Potter*

ATTORNEY

Patented June 22, 1954

2,681,567

UNITED STATES PATENT OFFICE 2,681,567

SYSTEM FOR OBTAINING AND TRANSMITTING MEASUREMENTS IN WELLS DURING DRILLING

Moses B. Widess, Tulsa, Okla., assignor to Stanolind Oil and Gas Company, Tulsa, Okla., a corporation of Delaware Application December 29, 1949, Serial No. 135,755

8 Claims. (Cl. 73—151)

This invention relates to subsurface measurements in wells and is directed particularly to making these measurements for such purposes as logging well formations while they are in the process of being drilled, observing the action of the drilling tools, and the like.

A number of techniques have been suggested and tried heretofore for the purpose of logging wells or making other subsurface or bottom-hole measurements during drilling, but none of these proposals has met with complete success or been widely adopted for commercial use. For this there are a number of reasons, probably the most fundamental being that the transmitting of signals for conveying the bottom-hole information from the bottom of the bore hole to the earth's surface is exceedingly difficult. The devices which have been able to do this with some success, chiefly insulated conductors within the drill pipe and provided with insulated connectors at the drill-pipe joints, have been very expensive in both initial and maintenance costs. The transmission of electrical signals directly through the earth itself as the transmitting medium has so far been unsuccessful except at shallow depths because of the unfavorable conditions of attenuation and interference from electrical disturbances. Transmission of the bottom-hole information by acoustic signals similarly has to overcome attenuation difficulties and high levels of background noise. A further obstacle is the frequently severe vibration near the drill bit, which limits the equipment used for performing the desired subsurface measurements to only the most simple and rugged types.

It is therefore a primary object of this invention to provide an improved apparatus for carrying out subsurface or logging measurements during drilling. Another object is to provide such an apparatus which is of comparatively simple, inexpensive, and rugged construction and which does not require insulated electrical conductors within the drill pipe. It is a further object of the invention to provide an apparatus for making and transmitting bottom-hole measurements by utilizing the circulating drilling-fluid stream as the carrying or transmitting medium. It is a still further object of the invention to provide a bottom-hole measurement and transmission system which is in some degree controllable from the surface as to its manner of operation. Other and further objects, uses, and advantages of the invention will become apparent as the description proceeds.

In general, the system for obtaining and transmitting bottom-hole or logging information during drilling is one utilizing the drilling-fluid stream to transport an identifiable record-carrying medium or substance from within the well, where the desired measurement is made and impressed on the medium, to the ground surface where the record medium is recovered and analyzed to ascertain the magnitude of the subsurface variable. The making of the record, or in any way operating on the record medium to give it a significance reflecting the magnitude of the subsurface variable is called "modulation" in the subsequent description. There are various ways of carrying out this concept, some of which will be described in detail. Thus, in one embodiment, a measuring and record-making device in a housing within the drill-pipe string ejects or releases into the drilling-fluid stream periodically, or as desired, a record bearing the subsurface information. This record is recovered at the surface and studied or analyzed in such a way as to make available the desired information on the magnitude of the subsurface variable. According to another embodiment, a detectable substance is released or injected quantitatively into the circulating drilling-fluid stream in a manner which is determined by the magnitude of the subsurface variable being studied. At the ground surface, this substance is picked up and its presence or amount measured or indicated in a suitable way to reproduce this magnitude. The preferred substance is one which is readily released by or recovered from the drilling fluid at the surface so that its concentration in the drilling-fluid stream does not build up.

The principles of the invention and these embodiments will be better understood by reference to the accompanying drawings forming a part of this application, in the different figures of which drawings the same reference numerals are applied to the same or corresponding parts. In these drawings.

Figures 1, 2:
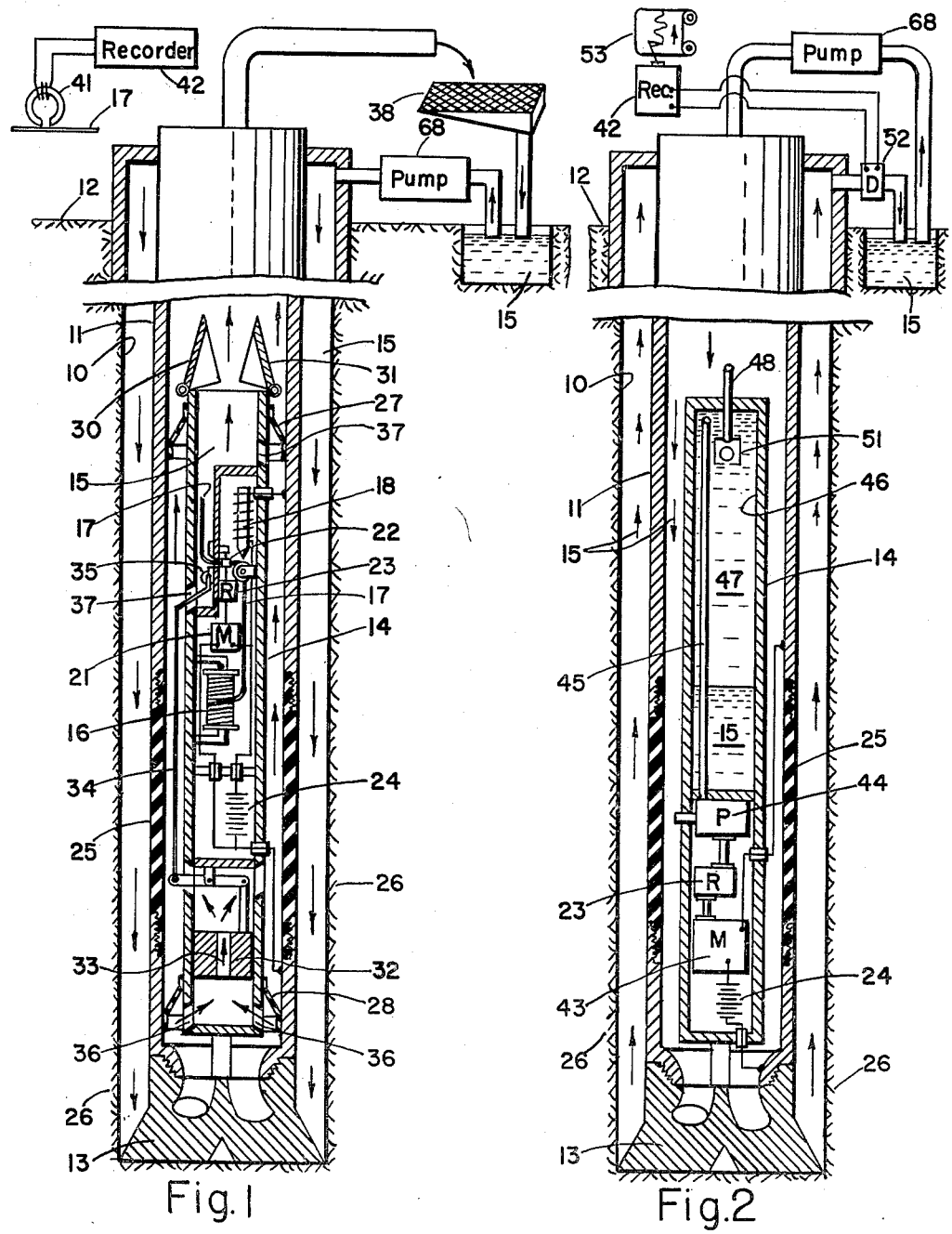
Figure 1 shows in partial cross-section an embodiment of the invention adapted to make an electrical log of the well formations being drilled.
Figure 2 shows partially in cross-section an alternative embodiment of the invention in which a detectable substance is quantitatively released into the drilling-fluid stream.

Referring now to these drawings, and to Figure 1 in particular, an embodiment of the invention is shown which is adapted to make an electrical resistivity or conductivity log of the well formations being drilled. The making of a resistivity log is chosen only to illustrate the principles of the invention, since the record medium to be transported by the drilling-fluid stream to the ground surface can be modulated in a similar way of any other desired subsurface data. Within a well 10 is a drill pipe 11 extending from the ground surface 12 and terminating in a drill bit 13 at the bottom of the well 10. Within drill pipe 11, adjacent bit 13 at the bottom of the well, is an elongated instrument housing 14 around which the stream of drilling fluid 15 may pass freely in a downward direction. Within a compartment of the housing 14 is a supply spool 16 from which a ferromagnetic wire or tape 17 is drawn past a magnetic recording head 18 by a small substantially constant-speed electric motor 21, turning a friction drive roller 22 slowly through a reduction gear 23. A battery 24, in a suitably sealed compartment, provides power for the motor 21 and is connected also through the coil of magnetic recording unit 18 to the drill pipe 11.

A section of insulation 25 between the drill pipe 11 and the drill bit 13, in contact with the bottom of well 10 and connected to the other terminal of battery 24, forces at least a portion of the battery current to flow through the earth 26 surrounding bit 13 and thence to the drill pipe 11 and through the recording head 18. However, with such an arrangement, the magnitude of the current flowing through the earth 26 and the head 18 will vary in accordance with the electrical resistivity of these formations. As a result, the magnetization of the wire or tape 17 will be correspondingly modulated as it is drawn past recording head 18 and ejected from the sealed portion of housing 14.

On the outside of housing 14 are a pair of spaced downwardly facing resilient cups 27 and 28 which offer little or no resistance to the drilling-fluid stream as it passes downwardly inside pipe 11 around housing 14. The top of the housing 14 is normally closed by a pair of pivoted flap valves 30 and 31 which, however, are free to open if fluid pressure is exerted inside them. In the lower portion of housing 14 is a piston 32 having an orifice 33 and coupled by a suitable connecting rod 34 to a record cut-off mechanism 35.

In normal drilling, with fluid 15 circulating downwardly through pipe 11 past housing 14, no appreciable resistance to flow is offered by the cups 27 and 28. When it is desired to recover a record of the sub-surface resistivity, however, the direction of the drilling-fluid stream 15 is reversed from the normal so as to be upward through the drill pipe 11. In this case, the lower cup 28 forms a seal against the inside of the drill collar and diverts the drilling fluid through openings 36 into the bottom of instrument housing 14 and through the orifice 33 of piston 32, thereby exerting on it a force which is transmitted by the rod 34 to the cutter 35, releasing the projecting portion of record tape or wire 17. The upper rubber cup 27 similarly deflects the drilling fluid 15 into openings 37 and through the upper end of housing 14 and carries the cut-off portion of the tape or wire 17 through the now-open valves 30 and 31 into the drill pipe 11 and thence to the surface 12 where the record wire 17 is recovered on a screen 38 through which the drilling fluid 15 passes. The recovered wire or tape is then passed through an analyzer or pickup mechanism 41 operating an indicator or recorder 42, thus providing a record of the resistivities of the formations 26 being drilled through while the tape 17 was being pulled past recording head 18. It will be understood that the cut-off mechanism 35 can be arranged to shape or mark the end of the wire or tape 17 so that it can be run in the proper direction through reproducer 41.

Instead of or in addition to periodically releasing lengths of tape 17 into drilling fluid 15 while the drilling is progressing, a record can be made of a considerable section of the hole, say the previously drilled 100-foot section, without rotation of bit 13, simply by raising or lowering drill pipe 11. This record is then released and recovered in the manner described and provides a log which serves either as the primary information or as a check on the detailed log plotted from a number of record segments each from a short section of the hole.

Also, to facilitate record recovery at the surface, the tape 17 can comprise a ferromagnetic coating on a base of light-weight plastic or fabric so that it will float on the surface of the drilling-fluid settling pit. Further, to make more certain that the records are recovered and analyzed in proper sequence, the tape or wire 17 can be numbered or coded before winding on the supply spool 16 so that each segment bears one or more identifying marks of a series.

In Figure 2 is shown an apparatus embodying the invention, but utilizing the drilling-fluid stream as the carrier of a modulated record substance in a somewhat different but analogous way. Within the housing 14, one terminal of the battery 24 is connected to the insulated bit 13, while the other is coupled through a variable speed motor 43 to the uninsulated portion of the drill pipe 11. Thus the magnitude of the battery current, and hence the speed of the motor 43, is determined by the resistivity of the surrounding earth formations 26 which constitute a variable resistance in the series circuit. Through the reduction gearing 23 the motor 43 drives a small positive displacement pump 44 having an inlet tubing 45 extending into a chamber 46 in the upper portion of housing 14, the outlet of pump 44 extending through the wall of housing 14 into the surrounding drilling fluid 15. Within this chamber 46 is a supply of a substance 47 which is detectable in the presence of drilling fluid such as, for example, a liquefied petroleum gas. The substance 47 is confined in the chamber 46, and the pressure is equalized by admitting drilling fluid 15 into the chamber through a tube 48 and check valve 51. With this arrangement, and depending on the particular type of displacement pump 44, the modulation of the substance 47 consists of injecting it into the drilling-fluid stream 15 either at a rate proportional to the speed of motor 43 and thus to the formation conductivity, or in small globules or quantities at a frequency proportional to the conductivity, which, of course, is merely the inverse of the formation resistivity.

At the ground surface 12, the drilling-fluid stream 15 passes through a suitable detector 52 for the injected substance 47, which detector operates the recorder 42 and indicates on the chart 53 the modulation bearing the subsurface data in the form of variations in concentration of the substance 47 or the frequency of receipt of globules of the substance 47 at the surface 12. The chart 53 may be moved in accordance with time, or with the depth of the bit 13 when the substance 47 was released as explained, for example, in Hayward Patent 2,214,674, or in any other desired manner conventional in well logging.

One of the liquefied petroleum gases such as propane or butane, or a mixture of propane and butane, is particularly suitable for use in this embodiment, as it may be readily held in liquid form in the chamber 46 under the pressure exerted by the column of drilling fluid 15, but it is sufficiently volatile and non-miscible with the drilling fluid to separate and be easily detected at the surface 12 by any conventional detector 52 for combustible gases. Also, volatile substances like propane which separate easily from the drilling fluid are highly desirable because they are not recirculated through the well 10 to build up an increasing concentration. About the only apparent disadvantage is that the injected light hydrocarbons may be confused with naturally occurring hydrocarbons entering the drilling fluid 15 while drilling through an oil or gas producing formation. But even in that event the presence of propane does not interfere with the detection of the oil by fluorescence; and further, it is well known in the art of gas detection to make separate determinations of lighter and heavier components in a mixture of such gases, so that naturally occurring methane and ethane can readily be detected despite the presence of injected propane or butane.

Figure 3:
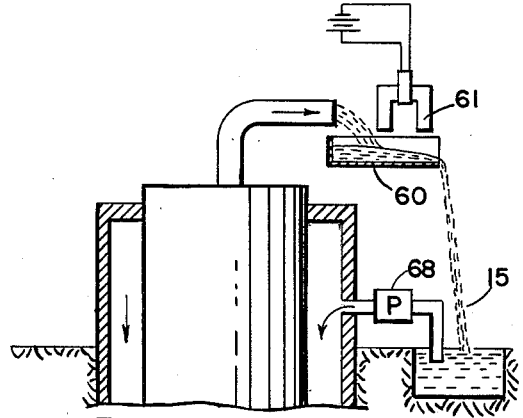
Figure 3 shows a further modification of the invention adapted to the measurement of drill bit vibrations as an example.
Figure 3:
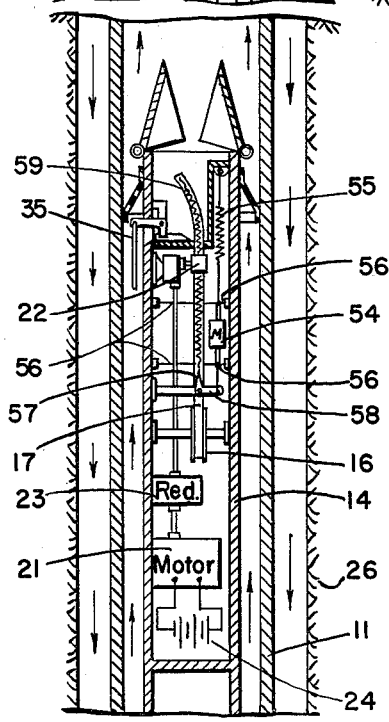

In Figure 3 is shown an embodiment of the invention adapted to measure a quantity such as, for example, the vibration of the drill pipe adjacent the drill bit utilizing a different means for recovering the record 17 at the surface 12. Thus, within the housing 14 is a mass 54 suspended from the housing by a spring 55 and restrained from lateral vibration by sets of leaf springs 56 which, however, do not interfere with the free movement of mass 54 in a vertical direction. Also within the housing 14 is a spool 16 of thin metallic, preferably ferromagnetic, tape 17, which tape is drawn from the spool 16 and ejected from housing 14 by the friction drive rollers 22 driven by the electric motor 21 through the reduction gear 23. Bearing against the tape 17 between the spool 16 and the friction drive rollers 22, is a scriber 57 coupled by a linkage 58 to the suspended mass 54. Motor 21 is supplied with power by the battery 24 and, in this embodiment, operates at a relatively constant speed to advance the tape 17 past the scriber 57.

With this arrangement, vertical vibrations of the housing 14 and other mechanism, relative to the suspended mass 50 which tends to remain stationary, appear as a wavy scratch or trace 59 drawn on the tape 17 as it is pulled past the scriber 57. Since such vibrations are often characteristic of the type of formations 26 being drilled by the bit 13, or in a given formation are significant of the drilling conditions such as weight, rotation speed, or bit sharpness, the records obtained are useful either for logging or drilling studies.

Periodically or as desired, modulated or recorded segments of the tape 17 are cut off and released into the drilling-fluid stream by the cut-off mechanism 35 and are recovered at the earth's surface by passing the drilling fluid 15 through an open trough 60 past the poles of an electromagnet 61 which attracts and withdraws the strips of tape 17 from the drilling fluid passing by. Such a simplified and reliable recovery mechanism as the electromagnet can be used in this embodiment because the tape 17 is impressed with a mechanical rather than a magnetic record, which could be distorted or destroyed by the field of the electromagnet 61.

Figure 4:
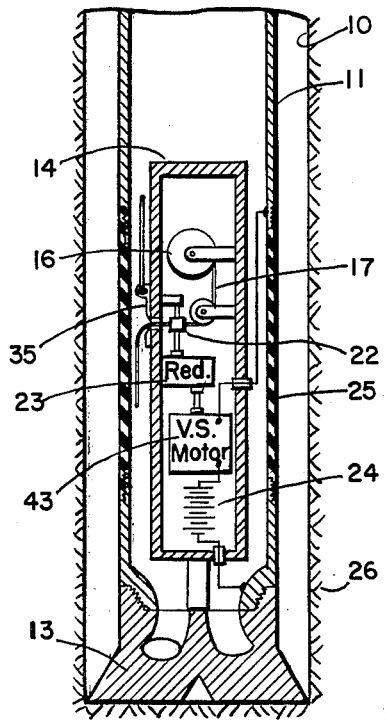
Figure 4 shows a modification of the invention combining features of both the Figure 1 and Figure 2 embodiments.

A similar surface recovery mechanism is adaptable to the modification of the invention shown in Figure 4, which combines certain features of the embodiments shown separately in Figures 1 and 2. In Figure 4, the battery 24 and the variable-speed motor 43 include the resistive earth formations 26 in the electrical circuit of the battery 24, so that the motor 43 drives the friction roller 22 through the reduction gearing 23 at a varying speed, depending on the earth-formation conductivity, as in the Figure 2 embodiment. Friction roller 22 withdraws ferromagnetic wire 17 from the supply spool 16, but, in this case, the length of the wire 17 withdrawn per unit time or per unit depth of penetration of the bit 13 rather than the impressed magnetism is the record modulation, which represents an average or integrated value of the conductivity of all the earth formations 26 drilled during the time or depth interval. It is thus necessary only to measure the lengths of the wire segments recovered in sequence from the drilling-fluid stream 15 by the electromagnet 61 at the surface and plot these lengths as a function of depth in order to obtain the well-formation conductivity log. If preferred, it is of course a simple matter to convert the length measurements to resistivity rather than to conductivity, which is the inverse function. Further it is also possible to cut off segments of the wire 17 at any desired intervals other than regular depth or time intervals, providing of course proper allowance is made for the length of each particular interval in converting the measured length of wire segments to resistivity or conductivity.

In place of the metallic tape on wire 17 shown in the embodiments of Figures 3 and 4, lightweight plastic or fabric tapes or cords, for example, wax-coated linen, recoverable on a screen 38, or from the surface of the drilling fluid 15 in the slush pit can be employed. Also enough of a ferromagnetic coating can be used to make the segments recoverable by the electromagnet 61 without causing them to sink in the drilling fluid.

Another desirable modification permits the recording of two or more variables simultaneously by placing two or more traces on a single tape, or by placing both mechanical and magnetic records on the same segment. Thus the tape 17 of Figure 3 can carry a mechanical trace made by a scriber 57, plus a magnetic record impressed by a head 18, and be of a length representing still a third variable. In this case, the tape is recovered preferably by mechanical screening of the drill mud returns rather than by a magnetic recovery system.

In the description so far, the mechanism for releasing record segments into the drilling-fluid stream 15 has been actuated by reversing the direction of flow of drilling fluid in the drill pipe 11. This is, of course, only one of many possible ways of accomplishing this function. A mechanism operating the cutter 35 at uniform intervals of time, or after a desired number of revolutions of the bit 13, could be included in the bottom-hole mechanism.

Figure 5:
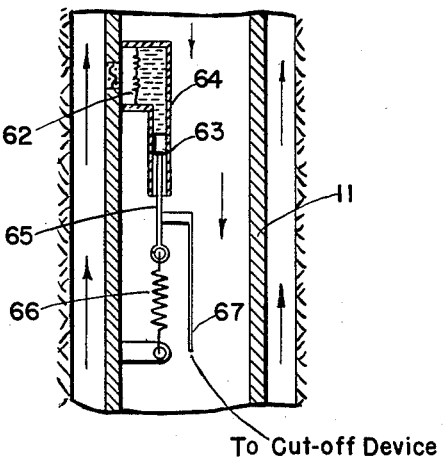
Figure 5 shows a modified device for controllably releasing the subsurface records into the drilling-fluid stream by manipulations performed at the surface.

In Figure 5 is shown an alternative mechanism for actuating the cutter 35, which mechanism is readily controllable as to its operation from the ground surface 12. In this modification advantage is taken of the pressure drop of the drilling-fluid stream 15 in passing through the orifices of bit 13. As is well known, a pressure differential is created between the inside and the outside of the drill pipe 11; and, in the apparatus shown in Figure 5, this pressure is applied through a diaphragm 62 to a piston 63 in a hydraulic cylinder 64. A restraining mechanical force is applied to the piston 63 by a connecting rod 65 coupled to a spring 66 anchored to the inside of the drill pipe 11. Piston 63 is thus exposed on one side to the fluid pressure outside drill pipe 11 and on the other to the fluid pressure inside, and it thus assumes a position where the force of spring 66 balances the hydraulic force of the differential fluid pressure. A rod or cable 67 extends from the piston rod 65 to the cut-off mechanism 35.

Whenever it is desired to release a segment of record 17 into the drilling-fluid stream 15 with this mechanism, it is only necessary to alter the flow velocity of the stream 15 momentarily, such as, for example, by shutting down the slush pump 68 for an instant, and the resulting movement of the piston 63, due to the change in differential fluid pressure, actuates the cutter 35. Although it is most often preferable to utilize a drilling-fluid circulation system in which the circulation is upwardly through the drill pipe 11, as there is less opportunity for record segments 17 to be lost or damaged in transit to the ground surface 12, it is, of course, also possible to utilize the mechanism of Figure 5 and recover records with drilling-fluid circulation in the so-called normal direction.

While I have thus described my invention in terms of the foregoing specific embodiments and modifications, it should be understood that these are for purposes of illustration only; and the scope of the invention should not be considered as limited thereby, but is to be ascertained from the appended claims.

I claim:

1. Apparatus for making subsurface measurements during the drilling of wells utilizing a circulating drilling-fluid stream comprising a housing adapted to be located within a drill pipe, means in said housing for measuring a subsurface variable within a well, a supply of a record-carrying medium within said housing, means actuated by said measuring means for modulating said medium in accordance with the magnitude of said variable, means for ejecting the modulated medium from said housing into said drilling-fluid stream, and recovery means at the surface at the top of said well for separating said medium from said stream, whereby said magnitude may be ascertained.

2. Apparatus for making subsurface measurements during the drilling of wells utilizing a circulating drilling-fluid stream comprising a housing adapted to be located within a drill pipe, means in said housing for measuring a subsurface variable within a well, a supply of an elongated record-carrying medium within said housing, means actuated by said measuring means for modulating said medium in accordance with the magnitude of said variable, means for ejecting modulated sections of the medium from said housing into said drilling-fluid stream, means for severing lengths of said medium, whereby they are released into said drilling-fluid stream and carried thereby to the surface at the top of said well, and recovery means for said lengths at the surface, whereby said lengths after recovery may be analyzed to ascertain said magnitude.

3. Apparatus for making subsurface measurements during the drilling of wells utilizing a circulating drilling-fluid stream comprising a housing adapted to be located within a drill pipe, means in said housing for measuring a subsurface variable within a well, a supply of an elongated ferromagnetic record-carrying medium within said housing, means actuated by said measuring means for magnetizing said medium in accordance with the magnitude of said variable, means for ejecting said medium from said housing into said drilling-fluid stream, means for severing lengths of said medium projecting from said housing, whereby they are released into said stream and carried thereby to the surface at the top of said well, and a screen for removing said severed lengths from said drilling-fluid stream at the surface, whereby said lengths may be analyzed to ascertain said magnitude.

4. Apparatus according to claim 3 in which said means for severing lengths of said medium are actuated by changing the flow of said drilling-fluid stream.

5. Apparatus for making subsurface measurements during the drilling of wells utilizing a circulating drilling-fluid stream comprising a housing adapted to be located within a drill pipe, means in said housing for measuring a subsurface variable within a well, a supply of an elongated record-carrying medium within said housing, means actuated by said measuring means for withdrawing from said supply segments of said medium proportional in length to the average magnitude of said variable over an interval, means for releasing said segments from said housing into said drilling-fluid stream, whereby they are carried by said stream to the surface at the top of said well, and means for recovering said lengths from said drilling-fluid stream at the surface, whereby said segments may be measured to ascertain said magnitude.

6. Apparatus according to claim 5 in which said medium is ferromagnetic and the surface recovery means possesses a magnetic field capable of attracting said segments and removing them from said stream.

7. Apparatus for making subsurface measurements during the drilling of wells utilizing a circulating drilling-fluid stream comprising a housing adapted to be located within a drill pipe, means in said housing for measuring a subsurface variable within a well, a chamber in said housing containing a supply of a liquid detectable in the presence of drilling fluid and readily separable therefrom, means actuated by said measuring means for displacing said liquid from said chamber into the drilling-fluid stream at a rate proportional to the magnitude of said variable, whereby said liquid is carried by said drilling-fluid stream to the surface at the top of said well, and means at the surface for collecting substantially all of said liquid separating from said drilling-fluid stream, whereby a detector associated with said collecting means may measure the quantity of said liquid and said magnitude may be ascertained.

8. Apparatus for making subsurface measurements during the drilling of wells utilizing a circulating drilling-fluid stream comprising a housing adapted to be located within a drill pipe, means in said housing responsive to a subsurface variable within a well and producing an electric current proportional to the magnitude of said variable, a supply of a record-carrying medium within said housing, means actuated by said electric current for modulating said medium in accordance with the magnitude of said variable, means for ejecting the modulated medium from said housing and releasing it into said drilling-fluid stream, whereby the released medium is carried by said stream to the surface at the top of said well, and recovery means at the surface for separating said medium from said stream, whereby said magnitude may be ascertained.

References Cited in the file of this patent

UNITED STATES PATENTS

| Number | Name | Date |
|---|---|---|
| 2,388,141 | Harrington | Oct. 30, 1945 |
| 2,414,246 | Smith | Jan. 14, 1947 |
| 2,468,905 | Warren, Jr. | May 3, 1949 |
| 2,528,882 | Hayward | Nov. 7, 1950 |